United States Patent
Ll et al.

(10) Patent No.: US 9,979,645 B2
(45) Date of Patent: May 22, 2018

(54) HARDWARE AND SOFTWARE METHODOLOGIES FOR CREATING AND MANAGING PORTABLE SERVICE FUNCTION CHAINS

(71) Applicant: Futurewei Technologies, Inc., Plano, TX (US)

(72) Inventors: Li Ll, Bridgewater, NJ (US); Tao Cai, Shenzhen (CN)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 321 days.

(21) Appl. No.: 14/596,546

(22) Filed: Jan. 14, 2015

(65) Prior Publication Data

US 2016/0205018 A1    Jul. 14, 2016

(51) Int. Cl.
*H04L 12/741* (2013.01)
*H04L 12/755* (2013.01)

(52) U.S. Cl.
CPC .......... *H04L 45/745* (2013.01); *H04L 45/021* (2013.01); *H04L 45/54* (2013.01)

(58) Field of Classification Search
CPC ..... H04L 12/46; H04L 12/56; H04L 12/5689; H04L 29/02; H04L 41/12; H04L 41/50; H04L 41/5041; H04L 41/5058; H04L 41/5083; H04L 45/021; H04L 45/04; H04L 45/22; H04L 45/306; H04L 45/54; H04L 45/586; H04L 45/74; H04L 45/745; H04L 47/18; H04L 47/31; H04L 61/6004; H04L 61/6022; H04L 63/168; H04L 63/22; H04L 67/10; H04L 45/38; H04L 47/2408; H04L 47/2441; H04L 47/2483; H04L 61/2007; H04L 69/22; H04L 67/16
See application file for complete search history.

(56) References Cited

U.S. PATENT DOCUMENTS

| 9,246,799 B2* | 1/2016 | Guichard | H04L 45/306 |
| 9,274,846 B2* | 3/2016 | Radier | G06F 9/5038 |

(Continued)

FOREIGN PATENT DOCUMENTS

| CN | 103905447 A | 7/2014 |
| CN | 103929492 A | 7/2014 |

(Continued)

OTHER PUBLICATIONS

International Search Report and Written Opinion dated Apr. 13, 2016 in International Patent Application No. PCT/CN2016/070819, 12 pages.

*Primary Examiner* — Eric Nowlin
(74) *Attorney, Agent, or Firm* — Vierra Magen Marcus LLP

(57) ABSTRACT

Embodiments of the present disclosure describe a self-contained service function network layer between a chain (e.g., a logical chain or service function chain) and a substrate network. Embodiments of the present disclosure further provide techniques for constructing logical chains for service function networks using chain tables, organizing chain tables using application program interfaces (APIs), deploying service function networks to substrate networks, routing packets through a service function network and a substrate network, and inserting, deleting, re-routing, moving and substituting service functions in logical chains.

10 Claims, 12 Drawing Sheets

(56) References Cited

U.S. PATENT DOCUMENTS

| | | | |
|---|---|---|---|
| 9,363,183 B2 * | 6/2016 | Kumar | H04L 61/2514 |
| 9,531,850 B2 * | 12/2016 | Nainar | H04L 69/22 |
| 9,634,867 B2 * | 4/2017 | Lee | H04L 12/6418 |
| 9,660,905 B2 * | 5/2017 | Dunbar | H04L 45/44 |
| 9,716,653 B2 * | 7/2017 | Gage | H04L 47/18 |
| 9,723,106 B2 * | 8/2017 | Shen | H04L 67/327 |
| 9,756,016 B2 * | 9/2017 | Hua | H04L 63/0263 |
| 9,794,379 B2 * | 10/2017 | Kumar | H04L 69/22 |
| 9,819,463 B2 * | 11/2017 | Gage | H04L 5/0053 |
| 9,825,769 B2 * | 11/2017 | Batz | H04L 12/1407 |
| 9,825,847 B2 * | 11/2017 | Haddad | H04L 45/38 |
| 9,825,856 B2 * | 11/2017 | Yong | H04L 45/74 |
| 9,842,240 B2 * | 12/2017 | Qu | G06K 7/1413 |
| 9,860,340 B2 * | 1/2018 | Shen | H04L 67/327 |
| 2010/0165985 A1 | 7/2010 | Sharma et al. | |
| 2011/0310901 A1 * | 12/2011 | Uchida | H04L 43/026 370/392 |
| 2012/0102197 A1 * | 4/2012 | Radier | G06F 9/5038 709/225 |
| 2013/0250958 A1 * | 9/2013 | Watanabe | H04L 45/54 370/392 |
| 2014/0019639 A1 * | 1/2014 | Ueno | H04L 61/103 709/238 |
| 2014/0195666 A1 * | 7/2014 | Dumitriu | H04L 12/4625 709/223 |
| 2014/0334488 A1 * | 11/2014 | Guichard | H04L 45/306 370/392 |
| 2014/0362857 A1 | 12/2014 | Guichard et al. | |
| 2015/0078381 A1 * | 3/2015 | Willis | H04L 45/02 370/392 |
| 2015/0131484 A1 * | 5/2015 | Aldrin | H04L 41/12 370/254 |
| 2015/0195197 A1 * | 7/2015 | Yong | H04L 45/74 370/392 |
| 2015/0215172 A1 * | 7/2015 | Kumar | H04L 43/026 709/223 |
| 2015/0236948 A1 * | 8/2015 | Dunbar | H04L 45/22 370/225 |
| 2015/0295831 A1 * | 10/2015 | Kumar | H04L 47/125 370/235 |
| 2015/0319078 A1 * | 11/2015 | Lee | H04L 12/6418 370/392 |
| 2015/0333930 A1 * | 11/2015 | Aysola | H04L 63/0471 370/392 |
| 2015/0334094 A1 * | 11/2015 | Suresh | H04L 63/0471 713/153 |
| 2015/0341285 A1 * | 11/2015 | Aysola | H04L 63/0428 370/392 |
| 2015/0365324 A1 * | 12/2015 | Kumar | H04L 12/4641 370/392 |
| 2016/0006651 A1 * | 1/2016 | Guichard | H04L 45/566 370/392 |
| 2016/0014763 A1 * | 1/2016 | Jauh | H04B 7/0452 370/329 |
| 2016/0028640 A1 * | 1/2016 | Zhang | H04L 45/306 370/389 |
| 2016/0099867 A1 * | 4/2016 | Guichard | H04L 45/306 370/392 |
| 2016/0127318 A1 * | 5/2016 | Hua | H04L 63/0263 726/1 |
| 2016/0134531 A1 * | 5/2016 | Assarpour | H04L 45/74 370/392 |
| 2016/0142321 A1 * | 5/2016 | Gage | H04L 47/18 370/235 |
| 2016/0164776 A1 * | 6/2016 | Biancaniello | H04L 45/306 370/392 |
| 2016/0165014 A1 * | 6/2016 | Nainar | H04L 69/22 370/392 |
| 2016/0198445 A1 * | 7/2016 | Ghosh | H04L 5/00 370/329 |
| 2016/0205018 A1 * | 7/2016 | LI | H04L 45/745 370/392 |
| 2016/0241315 A1 * | 8/2016 | Kwon | H04B 7/0452 |
| 2016/0248860 A1 * | 8/2016 | Dunbar | H04L 67/16 |
| 2016/0323165 A1 * | 11/2016 | Boucadair | H04L 43/12 |
| 2016/0344565 A1 * | 11/2016 | Batz | H04L 12/1407 |
| 2016/0344803 A1 * | 11/2016 | Batz | H04L 12/1407 |
| 2017/0012799 A1 * | 1/2017 | Jiang | H04L 12/6418 |
| 2017/0012865 A1 * | 1/2017 | Nainar | H04L 45/38 |
| 2017/0019302 A1 * | 1/2017 | Lapiotis | H04L 41/145 |
| 2017/0019373 A1 * | 1/2017 | Meng | H04L 12/6418 |
| 2017/0064039 A1 * | 3/2017 | Shen | H04L 67/327 |
| 2017/0078175 A1 * | 3/2017 | Xu | H04L 12/24 |
| 2017/0094002 A1 * | 3/2017 | Kumar | H04L 49/70 |
| 2017/0103243 A1 * | 4/2017 | Qu | G06K 7/1413 |
| 2017/0155582 A1 * | 6/2017 | Xu | H04L 45/74 |
| 2017/0188223 A1 * | 6/2017 | Gundavelli | H04W 8/04 |
| 2017/0195133 A1 * | 7/2017 | Salgueiro | H04L 12/4633 |
| 2017/0214613 A1 * | 7/2017 | Zhang | H04L 12/4633 |
| 2017/0214627 A1 * | 7/2017 | Zhang | H04L 47/31 |
| 2017/0222880 A1 * | 8/2017 | Callard | H04L 41/0866 |
| 2017/0230252 A1 * | 8/2017 | Khasnabish | H04L 41/142 |
| 2017/0230467 A1 * | 8/2017 | Salgueiro | H04L 67/16 |
| 2017/0237562 A1 * | 8/2017 | Quinn | H04L 9/3213 713/161 |
| 2017/0244528 A1 * | 8/2017 | Gage | H04W 24/02 |
| 2017/0250902 A1 * | 8/2017 | Rasanen | H04L 45/306 |
| 2017/0250903 A1 * | 8/2017 | Rasanen | H04L 45/306 |
| 2017/0264713 A1 * | 9/2017 | Shen | H04L 67/327 |
| 2017/0279712 A1 * | 9/2017 | Nainar | H04L 45/64 |
| 2017/0288909 A1 * | 10/2017 | Bottorff | H04L 12/6418 |
| 2017/0289032 A1 * | 10/2017 | Guichard | H04L 45/74 |
| 2017/0302470 A1 * | 10/2017 | Clark | H04L 41/0893 |
| 2017/0302623 A1 * | 10/2017 | Bifulco | H04L 47/2441 |
| 2017/0317926 A1 * | 11/2017 | Penno | H04L 45/36 |
| 2017/0331672 A1 * | 11/2017 | Fedyk | H04L 41/046 |
| 2017/0339072 A1 * | 11/2017 | Pignataro | H04L 49/3009 |
| 2017/0346752 A1 * | 11/2017 | Krishnamurthy | H04L 47/34 |
| 2017/0359252 A1 * | 12/2017 | Kumar | H04L 45/26 |
| 2017/0359265 A1 * | 12/2017 | Bosch | H04L 47/2441 |
| 2017/0373990 A1 * | 12/2017 | Jeuk | H04L 69/22 |

FOREIGN PATENT DOCUMENTS

| | | | |
|---|---|---|---|
| CN | 107005472 A * | 8/2017 | H04L 69/22 |
| EP | 3228054 A1 * | 10/2017 | |
| KR | 20170001655 A * | 1/2017 | |
| WO | 2015149624 A1 | 10/2015 | |
| WO | 2015165312 A1 | 11/2015 | |
| WO | WO 2016089400 A1 * | 6/2016 | H04L 12/6418 |
| WO | WO 2016089575 A1 * | 6/2016 | H04L 69/22 |
| WO | WO -2016089575 A1 * | 6/2016 | H04L 69/22 |
| WO | WO-2017180098 A1 * | 10/2017 | H04L 12/50 |
| WO | WO-2017189743 A1 * | 11/2017 | |

* cited by examiner

HARDWARE AND SOFTWARE METHODOLOGIES FOR CREATING AND MANAGING PORTABLE SERVICE FUNCTION CHAINS

FIELD

Embodiments of the present invention generally relate to the field of computer networking. More specifically, embodiments of the present invention relate to hardware and software methodologies for implementing and maintaining service function chains in a computer network.

BACKGROUND

Service function chains (SFC) provide ordered service functions (SFs) (e.g. firewall, network address translation, intrusion detection, proxy services, etc.) to add valuable services to the network and its users. In the majority of network designs and deployments, network functions are configured as a physical network element. This requires allocation of physical resources to enable the network functions. With the development of virtualization and new services, the physical resources required to support these network functions have increased rapidly.

With large scale services being deployed and customized by customers on an as-needed basis, linking various services requires complex configuration procedures. Furthermore, the ability to chain various services may be limited to specific compatible vendors and/or device types. Managing and maintaining these services has become a great hardship for administrators. As such, enabling new services often requires re-designing all or a significant part of the network in order to create the requisite service chain workflow to incorporate new service functions.

Current approaches to providing and maintaining network service function chains decouple logical chains from a physical network. Software-Defined Networking (SDN) is used to dynamically deploy logical chains to the network by configuring switches with chain-related routing rules. Generally, an SDN Controller inserts SFC routing rules into the switches of the network. The aggregate size of the SDN routing tables grows exponentially in relation to the length of the chains (e.g. 100 Firewalls and 100 Deep packet inspectors creates about 10,000 rules). Furthermore, ternary content-addressable memory (TCAM), typically used for SDN logical chains, has design limitations and is very expensive. Some current approaches also have difficulty handling SFC Spiral, where a single service function chain employs the same service function more than once. These approaches also require that the network switches are reconfigured when a logical chain is modified, even if the underlying SFs do not change (e.g. a reorder or reroute operation). Therefore, a more efficient, flexible, and manageable approach is needed for creating and managing portable service function chains.

SUMMARY

Accordingly, embodiments of the present invention are directed to a self-contained service function network layer between a chain (e.g., a logical chain or service function chain) and a substrate network. Embodiments of the present invention further provide techniques for constructing logical chains for service function networks using chain tables, organizing chain tables using APIs, deploying service function networks to substrate networks, routing packets through a service function network and a substrate network, and inserting, deleting, re-routing, moving and substituting service functions in logical chains.

According to one described embodiment, an apparatus for managing service function chains is disclosed. The apparatus includes a controller configured to control a plurality of service functions and a substrate network, where each service function is associated with an identifier and a network address, and the substrate network includes a plurality of network switches coupled to the controller, a chain table stored at a first service function of a service function chain, where the chain table stores an entry including a first identifier and an index of a next service function in the service function chain. The controller is further configured to generate a mapping including network addresses and associated identifiers, create or modify the entry of the chain table, and deploy the chain table to the first service function, where the first service function is operable to receive a packet, process the packet, and transfer the packet to the next service function.

According to another embodiment, an apparatus for routing packets in a service function chain is disclosed. The apparatus includes a packet processor operable to receive a packet, assign a chain ID to the packet, set an index value of a header of the packet to a first index associated with the chain ID, and set a destination value of the header to a first address associated with the first index, a first switch coupled to the packet processor and a first service function, where the first switch is operable to route the packet to the first service function, where the first service function is at the first address, a controller coupled to the first service function operable to store an address mapping table including plurality of service function IDs and a plurality of network addresses associated with the plurality of service function IDs, and a first chain table stored at the first service function including the chain ID, a next service function ID associated with the chain ID, and a next service function index associated with the chain ID. The first service function is operable to process the packet, determine the next service function ID and the next service function index using the first chain table, modify the header of the packet based on the next service function ID and the next service function index, and forward the packet to a second service function associated with the next service function ID.

According to a third embodiment, a method for managing a service function chain is disclosed and includes receiving a chain description and a key size at a controller, where the chain description includes a chain ID and a plurality of identifiers, and where each identifier is associated with a service function, calculating a gap value based on the key size and a number of identifiers in the chain description, associating an index with each identifier, where indexes are calculated based on the gap value, and generating a chain table for each service function including the chain ID and the index associated with the identifier.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
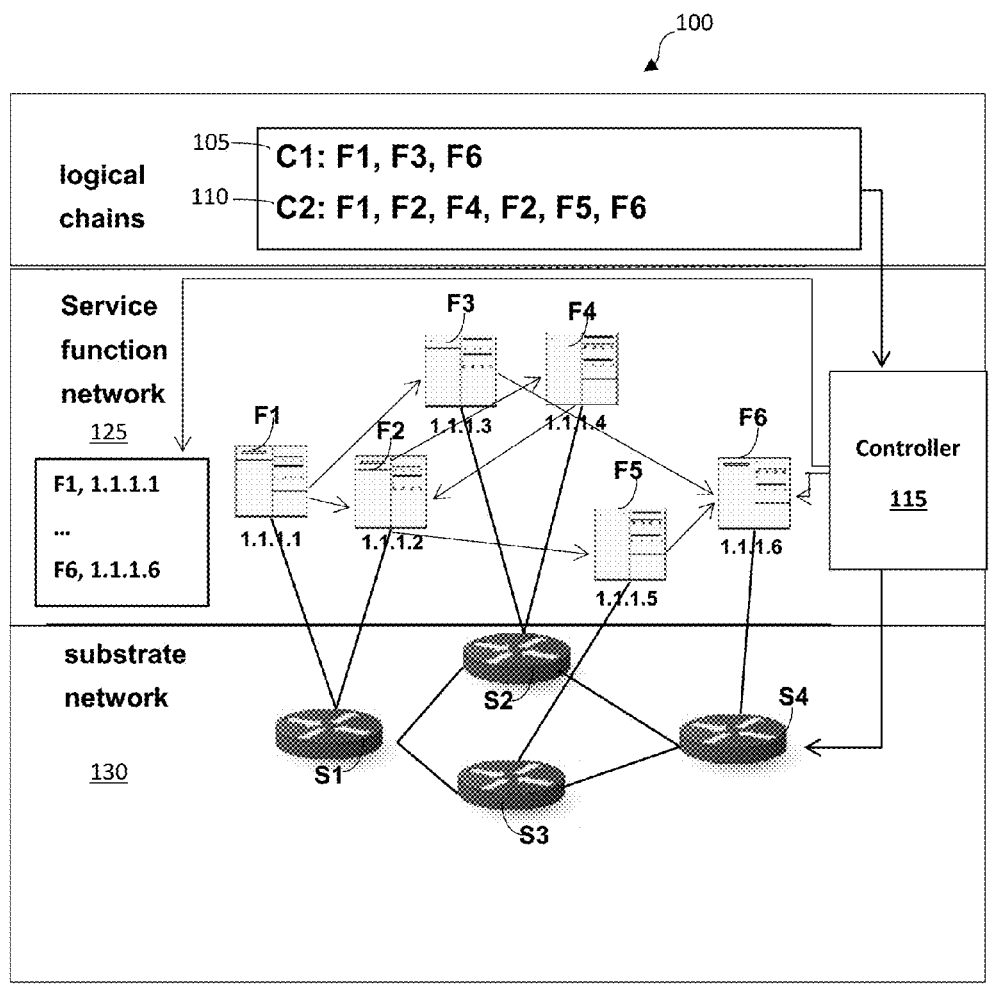
FIG. 1 is a diagram illustrating an exemplary service function and substrate network topology according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Hardware and Software Methodologies for Creating and Managing Portable Service Function Chains Embodiments of the present invention are directed to a self-contained service function network layer located between a logical chain layer and a physical or virtual substrate network. A chain may be referred to as a logical chain, a service function chain, or a virtual chain, for example. Embodiments of the present invention further provide techniques for constructing logical chains using service function networks and chain tables, organizing chain tables using chain APIs, deploying service function networks to substrate networks, routing packets through a service function network and a substrate network, and inserting, deleting, re-routing, moving and substituting service functions in logical chains.

The service function networks described by embodiments of the present invention are operable to be ported to different substrate networks when traffic load or components of the network change, and a logical chain may be modified, moved and/or rerouted based on actual or predicted quality of service or business needs. Memory requirements of switches are significantly reduced as chain related rules are refactored into existing chain tables. According to some embodiments, the service chains are self-contained and an NFV architecture is used. Service function spirals (e.g., (F1, F2)$^{100}$), where a service function is traversed more than once in a chain and may comprise different service functions, are enabled by the controller. Recursion, however, is prevented, (e.g., (F1, F2)*). Service functions may be inserted into or deleted from a chain by modifying a single chain table.

With regard to FIG. 1, an exemplary service function network and substrate network topology 100 is depicted according to embodiments of the present invention. Logical chains (e.g., chain C1 (105) and chain C2 (110)) are constructed and enabled using substrate network 130, which comprises a plurality of network switches (e.g., S1, S2, S3, and S4). Service functions of service function network 125 are identified using network independent identifiers (e.g., F1, F2, F3, F4, F5, and F6). However, other naming schemes may be used to identify the service functions.

Controller 115 constructs chain tables for the service functions used to store chain routing rules based on the logical chains (see FIG. 2) and deploys a chain network to a substrate network (e.g., a virtual or physical network). Controller 115 also establishes identifier/address mappings using routing tables (see FIG. 4). The service functions resolve identifiers to addresses (e.g. Layer-2 MAC address or Layer-3 IP address) before forwarding packets on the network. Network switches may route packets to function addresses without any knowledge of the actual logical chains. The controller is configured to modify a chain without requiring reconfiguration of the switches that connect the functions of the chain.

Figure 2:
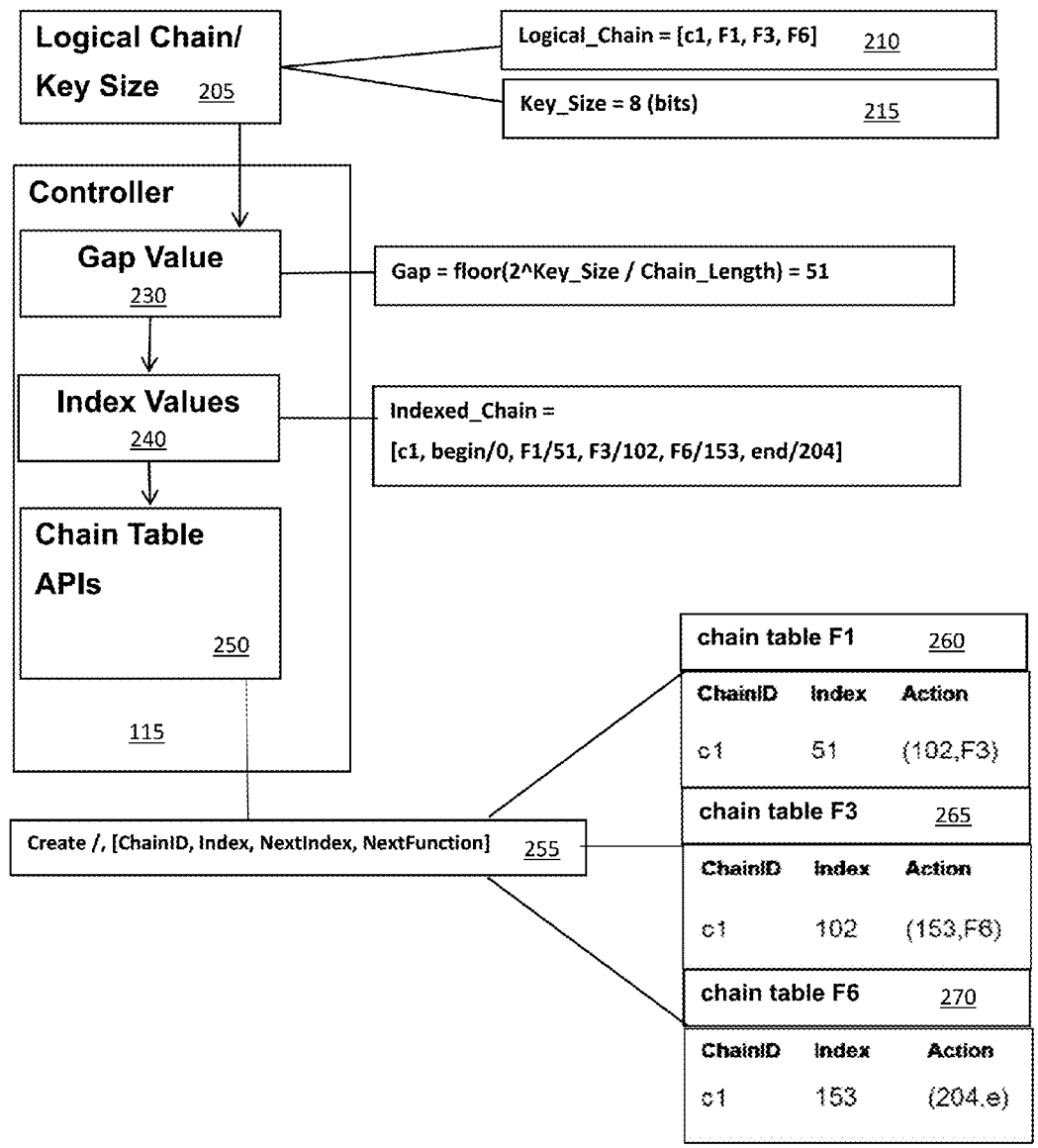
FIG. 2 is a diagram illustrating an exemplary controller configured to generate and manage network service chains according to embodiments of the present invention.
Figure 9:
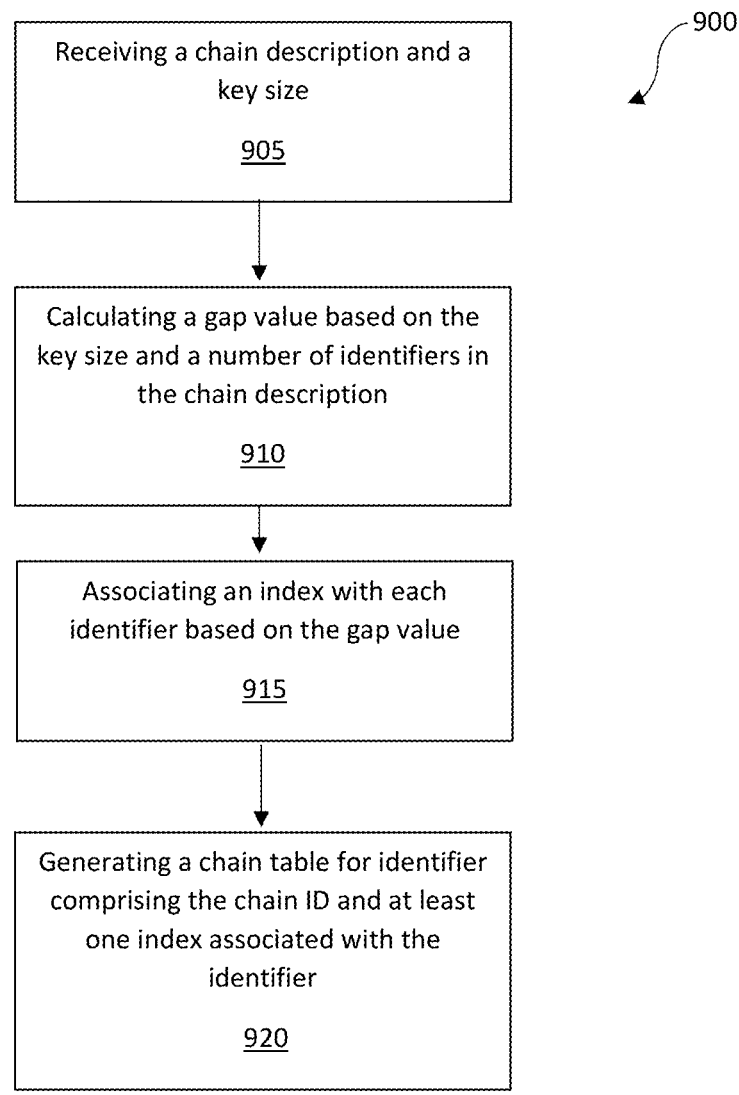
FIG. 9 is a flow chart illustrating an exemplary sequence of computer implemented steps for a process of generating and managing network service chains according to embodiments of the present invention.

With regard to FIG. 2, an exemplary controller 115 configured to generate and manage network service chains is depicted according to embodiments of the present invention. An exemplary sequence of computer implemented steps 900 for generating and managing network service chains according to embodiments of the present invention is depicted in FIG. 9 and described herein concurrently with FIG. 2. Logical chain/key size values 205 are input to controller 115 (step 905). As depicted in FIG. 2, logical chain description 210 comprising a value of [c1, F1, F3, F6], and a key size 215 comprising a value of 8 bits (for instance) are input into controller 115. These values are first used to determine gap value 230 (step 910). Gap value 230 is computed using the following formula depicted in Table 1:

TABLE 1

Gap = floor($2^{Key\_Size}$/Chain_Length)
Gap = floor($2^8$/5) = 51

In this case, the Chain_Length value is equal to 5 because there are three service functions (F1, F3, and F6), a start marker, and an end marker. The gap value determines how far apart to space the service functions in a service function chain. In this example, the gap value is 51. A longer chain may use a larger gap value to leave more space for additional service functions to be added. However, using larger gap values increases the amount of memory required to store the index for the logical chain.

Based on the computed gap value 230 and logical chain description 210, index values 240 for chain c1 are computed and associated with the service functions of the logical chain (step 915). As depicted in FIG. 2, chain c1 begins at index 0, service function F1 is at index 51, service function F3 is at index 102, service function F6 is at index 153, and chain c1 ends at index 204. The values are then used to generate instructions using chain table APIs 250 (step 920). For each service function, a chain table API call 255 is issued as depicted in Table 2:

TABLE 2

Create /, [ChainID, Index, NextIndex, NextFunction]
Create /,[c1, 51, 102, F3]

TABLE 2-continued

Create /,[c1, 102, 153, F6]
Create /,[c1, 153, 204, e]

The ChainID value is the Chain ID of the service function chain to which the table entry relates (e.g., chain c1). The Index value indicates the location of the service function in the chain (e.g., 51 or 102). The 'NextIndex' value indicates the location of the next service function in the chain, and the 'NextFunction' value indicates the identity of the service function (e.g., F3). A 'NextFunction' value of e indicates that the next stop in the chain is the end of the chain (e.g., an end marker). Chain tables for service function F1 (260), F3 (265), and F6 (270) are created using chain table API call 255.

Figure 3:
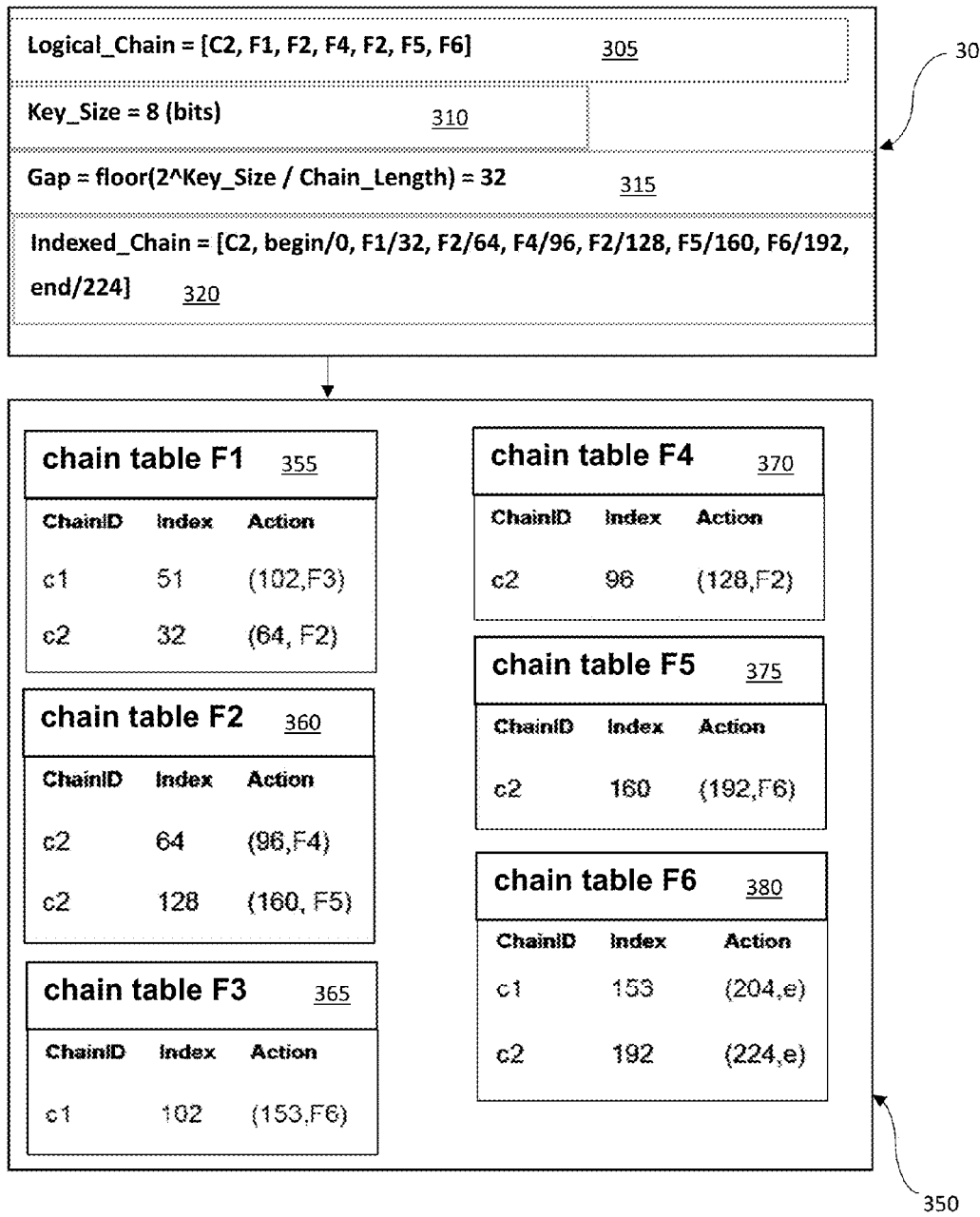
FIG. 3 is a diagram illustrating exemplary configuration values for a controller to generate chain tables according to embodiments of the present invention.

With regard to FIG. 3, exemplary configuration values 300 of a controller for generating a chain table are depicted according to embodiments of the present invention. Logical chain values 305 and key size value 310 are used to compute gap value 315. As described above, the gap value is determined using the formula Gap=floor($2^{Key\_Size}$/Chain_Length). In this case, gap value 315 is equal to 32. This value indicates that the first service function will be at index 32, the second service function will be at index 64, and so on. Based on gap value 315 and logical chain value 305, a controller generates index values (e.g., indexed_chain) to define a new logical chain 320. In this case, the logical chain is expressed as [C2, begin/0, F1/32, F2/64, F4/96, F2/128, F5/160, F6/192, end/224].

For each service function in the logical chain, an entry is added to the chain table of that service function. As depicted in FIG. 2, chain table F1 (355) already contains an entry for chain c1. After chain c2 has been created, the controller adds an entry to chain table F1 (355) with a chain ID of c2, an index value of 32, and an action value-pair of (64, F2), where 64 is the index of the next service function and F2 is the identifier of the next service function. Similar entries are created for the chain tables of F2, F4, F5, and F6. Chain table F2 (360) contains two entries for chain c2. This indicates that service function F2 is visited twice by chain c2. The first instance of service function F2 in chain c2 directs the packet to service function F4 at index 96. The second instance of service function F2 in chain c2 directs the packet to service function F5 at index 160.

As previously mentioned, a service function may be used more than once in a single chain, but recursive service function calls within a chain are not allowed. Chain table F3 (365) is not used by service chain c2 so it only contains an entry for chain c1. Chain tables F4 (370) and F5 (375) contain similar c2 entries to chain table F1 (355). Service function F6 is the last service function in chain c2 so the 'NextFunction' value is 'e', indicating the end of the chain (e.g., an end marker).

Figure 4:
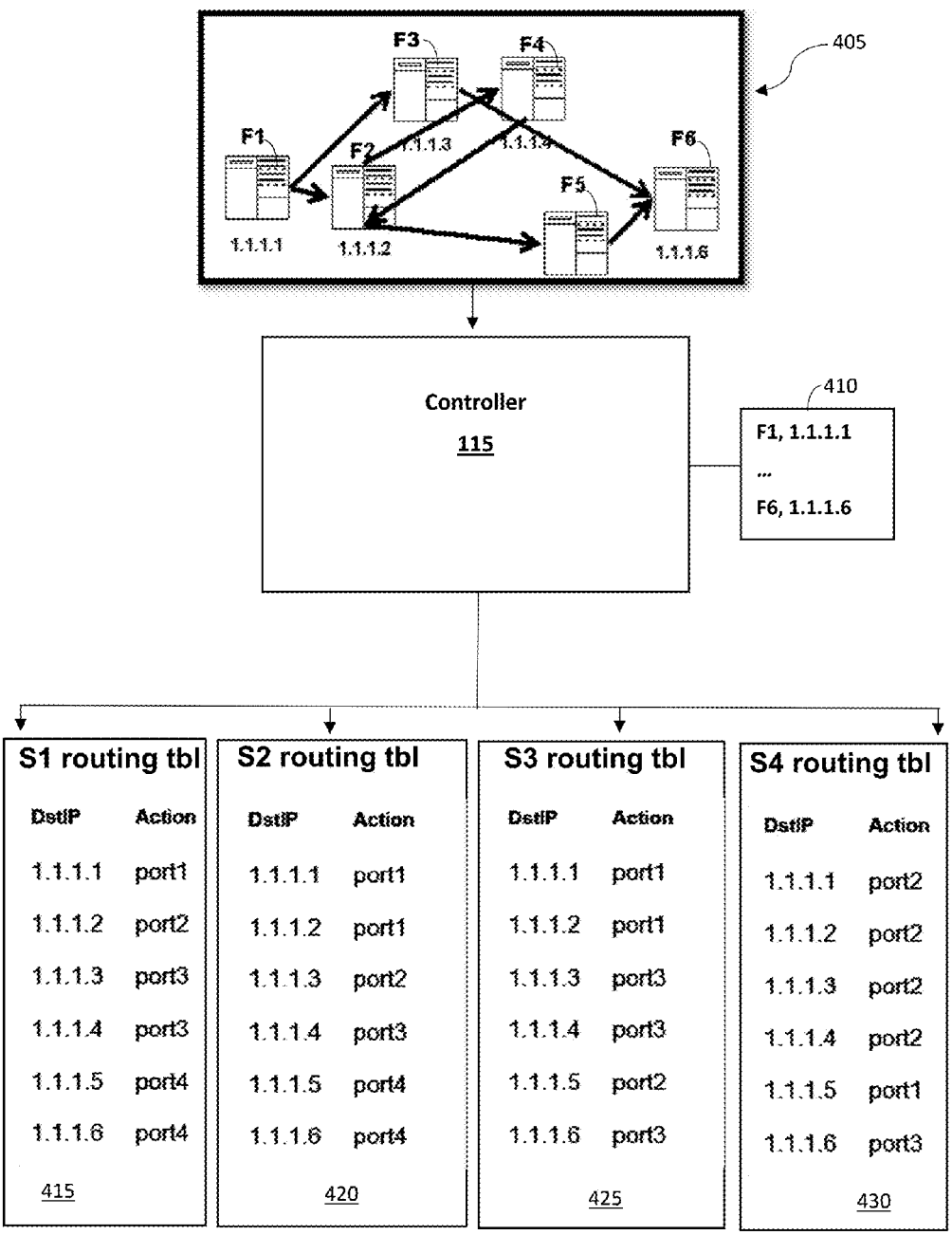
FIG. 4 is a diagram illustrating exemplary mapping and routing tables for a service function network and a substrate layer according to embodiments of the present invention.

With regard to FIG. 4, exemplary mapping and routing tables for a service function network and a substrate layer are depicted according to embodiments of the present invention. Components (e.g., service functions F1, F2, F3, F4, F5, and F6) of a service function network 405 are attached to a substrate network (e.g., substrate network 130) as hosts with associated network addresses (e.g., 1.1.1.1, 1.1.1.2, 1.1.1.3, 1.1.1.4, 1.1.1.5, and 1.1.1.6). Controller 115 records a mapping table 410 of service function identifiers with associated addresses (e.g., F1:1.1.1.1) at the controller, or in a centralized database or server accessible to the service functions. The associated addresses may be IPv4, IPv6, or MAC addresses, for example. The mappings are used by controller 115 to configure the network switches (e.g., S1, S2, S3, and S4) of substrate network 130 using routing tables associated with each network switch.

Routing tables generated by the controller indicate how to reach a destination IP from a particular network switch. Each entry in the routing tables comprises a destination address and an action value. For example, to reach destination IP address 1.1.1.1 from switch S1, a packet is forwarded on port 1 of switch S1. As depicted in FIG. 1, switch S1 is directly connected to service function F1, which has an IP address of 1.1.1.1. According to the S1 routing table (415), service function F1 is connected to port 1 of switch S1. As another example, as depicted in FIG. 1, service functions F3 (IP address 1.1.1.3) and F4 (IP address 1.1.1.4) are connected to switch S1 through switch S2. The S1 routing table (415) indicates that IP address 1.1.1.3 and 1.1.1.4 are accessed from switch S1 on port 3 (connected to switch S2). To reach IP address 1.1.1.3 (F3) from switch S2, port 2 of switch S2 is used. To reach IP address 1.1.1.4 (F4) from switch S2, port 3 of switch S2 is used.

Figure 5:
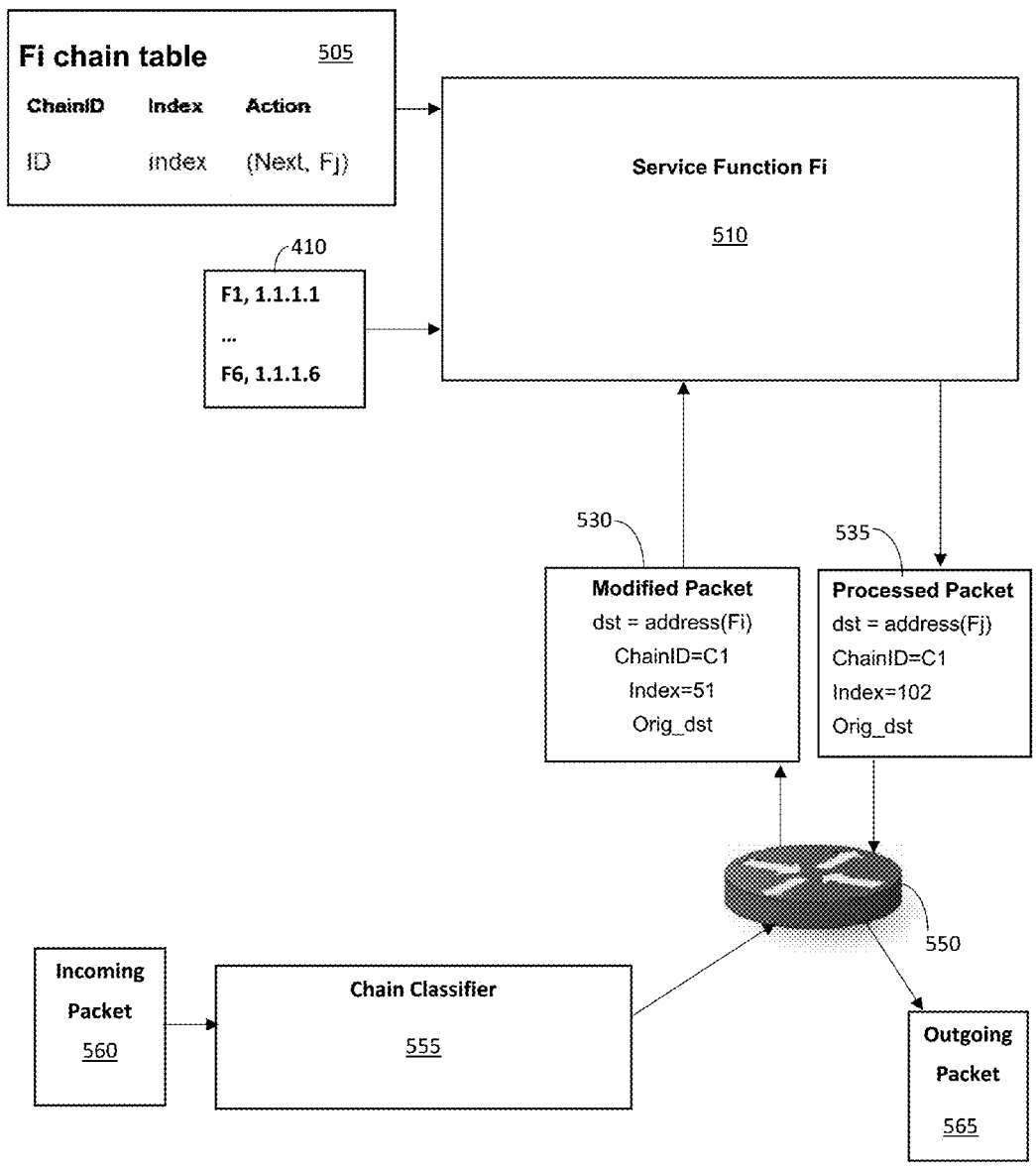
FIG. 5 is a diagram illustrating network components for routing packets through an exemplary service chain according to embodiments of the present invention.

With regard to FIG. 5, exemplary network components for routing packets through an exemplary service chain $F_i$ are depicted according to embodiments of the present invention. An incoming packet 560 is received by chain classifier 555. Chain classifier 555 comprises a packet processor for determining to which service function chain an incoming packet belongs and performs the following sequence of steps depicted in Table 3:

TABLE 3

Chain = classify(Packet)
Packet.ChainID = Chain.ID
Packet.Index = Chain.first.index
Packet.orig_dst = Packet.dst
Packet.dst = get_address(Chain.first.function)

The chain classifier retrieves information from the packet (e.g., from the packet's header) and determines the associated chain ID. A ChainID value of the packet is set based on the determined chain ID value, and an index value for the packet is set to the index of the first service function in the chain. The original intended destination of the packet is saved in 'Packet.orig_dst'. Next, the destination of the packet is changed from the original intended destination to the address of the first service function in the chain. The resulting packet is a modified packet. Chain classifier 555 then forwards modified packet 530 to the appropriate network switch (e.g., switch 550) using the routing tables. The network switch then forwards modified packet 530 to its destination (e.g., service function $F_i$).

Chain table Fi (505) and mapping table 410 are accessed by service function $F_i$ when a modified packet (e.g., modified packet 530) is received from a network switch (e.g., switch 550). Service function $F_i$ performs the following sequence of steps depicted in Table 4:

TABLE 4

(ChainID, Index) = Packet.extract( )
Entry = Chain_Table.lookup(ChainID, Index)
New_Packet = process(Packet)
New_Packet.index = Entry.action.Next
If Entry.action.function != end
　Then New_Packet.dst = get_address(Entry.action.function)
　Else New_Packet.dst = Packet.orig_dst
New_Packet.forward(Entry.action.port)

Service function Fi extracts a chain identifier and an index value from the received packet (e.g., modified packet 550). Service function Fi then accesses the entry in its chain table 505 corresponding to the chain identifier and index value. The packet is then processed by the service function. Depending on the type of service function involved, the processing may include the following tasks: deep packet inspection; applying firewall rules; intrusion detection measures; and/or processing acceleration, for example.

When the packet has been processed by the service function, the packet is referred to as processed packet 535. Service function Fi determines if the current service function is the last service function in the chain by consulting its chain table. If the current service function is not the last service function in the chain, the destination address of the packet is changed to the address of the next service function in the chain according to the mapping table. If the current service function determines that it is the last service function in the chain, the original destination of the packet (stored in 'Packet.orig_dst') is set as the packet's destination address. The process ends when the packet (e.g., processed packet 535) is passed to a network switch. The switch then generates outgoing packet 565 from processed packet 535 and forwards the outgoing packet to its destination.

Figure 6:
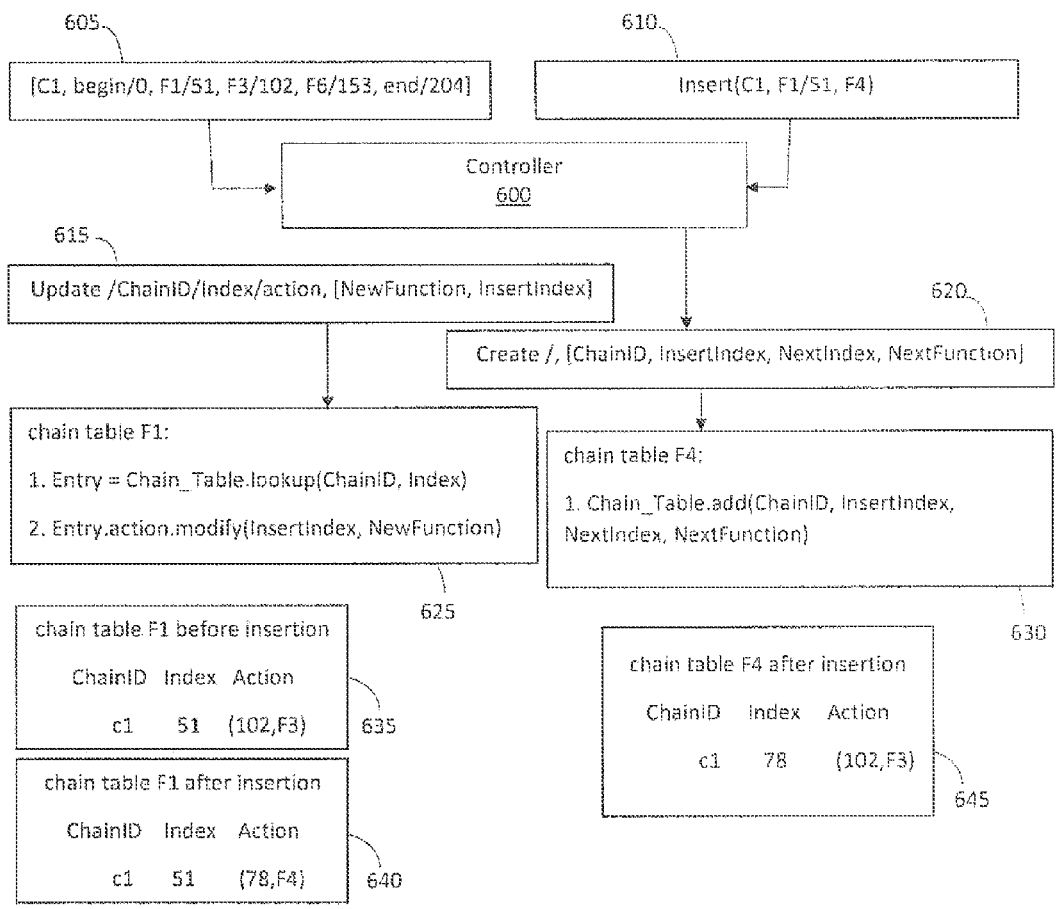
FIG. 6 is a diagram illustrating an exemplary controller configured to insert a service function into a service function chain using chain tables according to embodiments of the present invention.

With regard to FIG. 6, an exemplary controller 600 configured to insert a service function into a service function chain using chain tables is depicted according to embodiments of the present invention. Controller 600 receives a chain description/value 605 describing a chain C1 having service functions F1, F3, and F6 with a gap value of 51. An insertion instruction 610 is also received by controller 600 and indicates that a service function F4 is to be inserted into chain C1 after F1 (index 51). Controller 600 determines an available index for the service function to be inserted (e.g., service function F4) using the operation: InsertIndex=floor ((Index+NextIndex)/2). This operation determines an index roughly halfway between the current service function and the next service function. Where F4 is to be inserted between F1 (index 51) and F3 (index 102), F4 is set to an exemplary index value of 78. Chain table API instruction 615 is used to update chain table F1 (635): Update/ChainID/Index/action, [NewFunction, Inserandex]. Chain table API instruction 615 causes the controller to deploy a modified chain table to service function F1 as depicted in Table 5:

TABLE 5

Entry = Chain_Table.lookup(ChainID, Index)
Entry.action.modify(InsertIndex, NewFunction)

The corresponding entry of chain table F1 (635) is located based on the ChainID and Index values. Once the matching entry is determined, the 'InsertIndex' and 'NewFunction' values are used to modify the action values of the entry to 78 and F4, respectively. This indicates that the next action following service function F1 is service function F4 located at index 78. Chain table F1 (640) illustrates F1's chain table after the insertion operation.

Chain table API instruction 620 is used to update chain table F4 (635): Update/ChainID/Index/action, [NewFunction, InsertIndex]. Chain table API instruction 620 causes the controller to deploy a modified chain table to service function F4 based on function 630: Chain_Table.add(ChainID, InsertIndex, NextIndex, NextFunction). Function 630 adds a new entry to chain table F4 having a 'ChainID' value of c1, an index value of 78, a 'NextIndex' of 102, and a 'NextFunction' of F3. Chain table F4 (645) is depicted after the insertion operation. As depicted in FIG. 6, only chain tables for service functions F1 and F4 are modified. If F4 has been deployed, no modification of the underlying switches is necessary.

Figure 7:
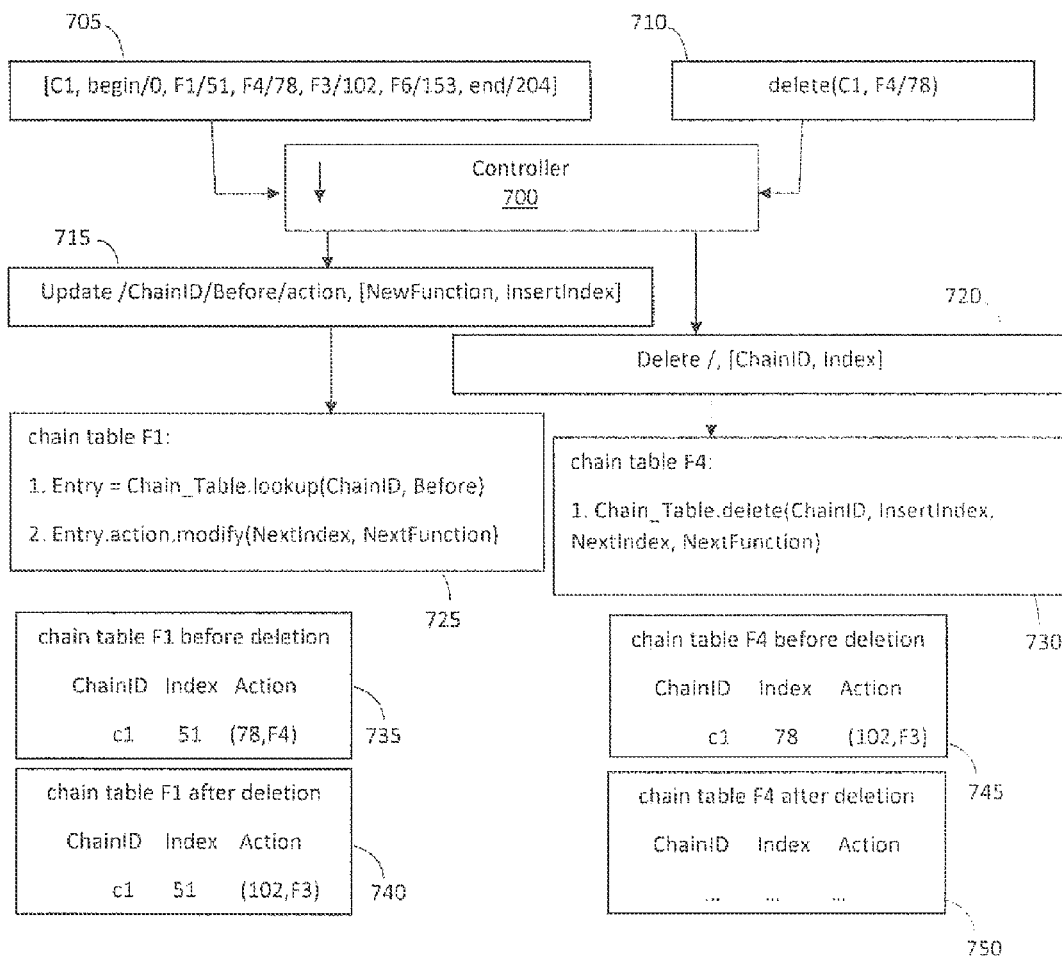
FIG. 7 is a diagram illustrating an exemplary controller configured to delete a service function from a service function chain using chain tables according to embodiments of the present invention.

With regard to FIG. 7, an exemplary controller 700 configured to delete a service function from a service function chain using chain tables is depicted according to embodiments of the present invention. Controller 700 receives a chain description 705 describing a chain C1 having service functions F1, F4, F3, and F6 with a gap value of 51. A deletion instruction 710 is also received by controller 700 and indicates that a service function F4 is to be deleted from chain C1. Chain table API instruction 715 is used to update chain table F1 (735): Update/ChainID/Before/action, [NextFunction, NextIndex]. Chain table API instruction 715 causes the controller to deploy a modified chain table to service function F1 based on functions 725 depicted in Table 6:

TABLE 6

Entry = Chain_Table.lookup(ChainID, Before)
Entry.action.modify(NextIndex, NextFunction)

The corresponding entry of chain table F1 (735) is located based on the ChainID. Once the matching entry is determined, the 'NextIndex' and 'NextFunction' are used to modify the action values of the entry to 102 and F3, respectively. This effectively deletes service function F4 from chain table F1. Chain table F1 (740) illustrates F1's chain table after the deletion operation.

Chain table API instruction 720 is used to update chain table F4 (745): Delete/, [ChainID, Index]. Chain table API instruction 720 causes the controller to deploy a modified chain table to service function F4 based on function 730: Chain_Table.delete(ChainID, InsertIndex, NextIndex, NextFunction). Function 730 deletes chain c1 from chain table F4. Chain table F4 (750) is depicted after the deletion operation. As depicted in FIG. 6, only chain tables for service functions F1 and F4 are modified. If F4 is still in use by other chains, no modification of the underlying switches is necessary.

Figure 8:
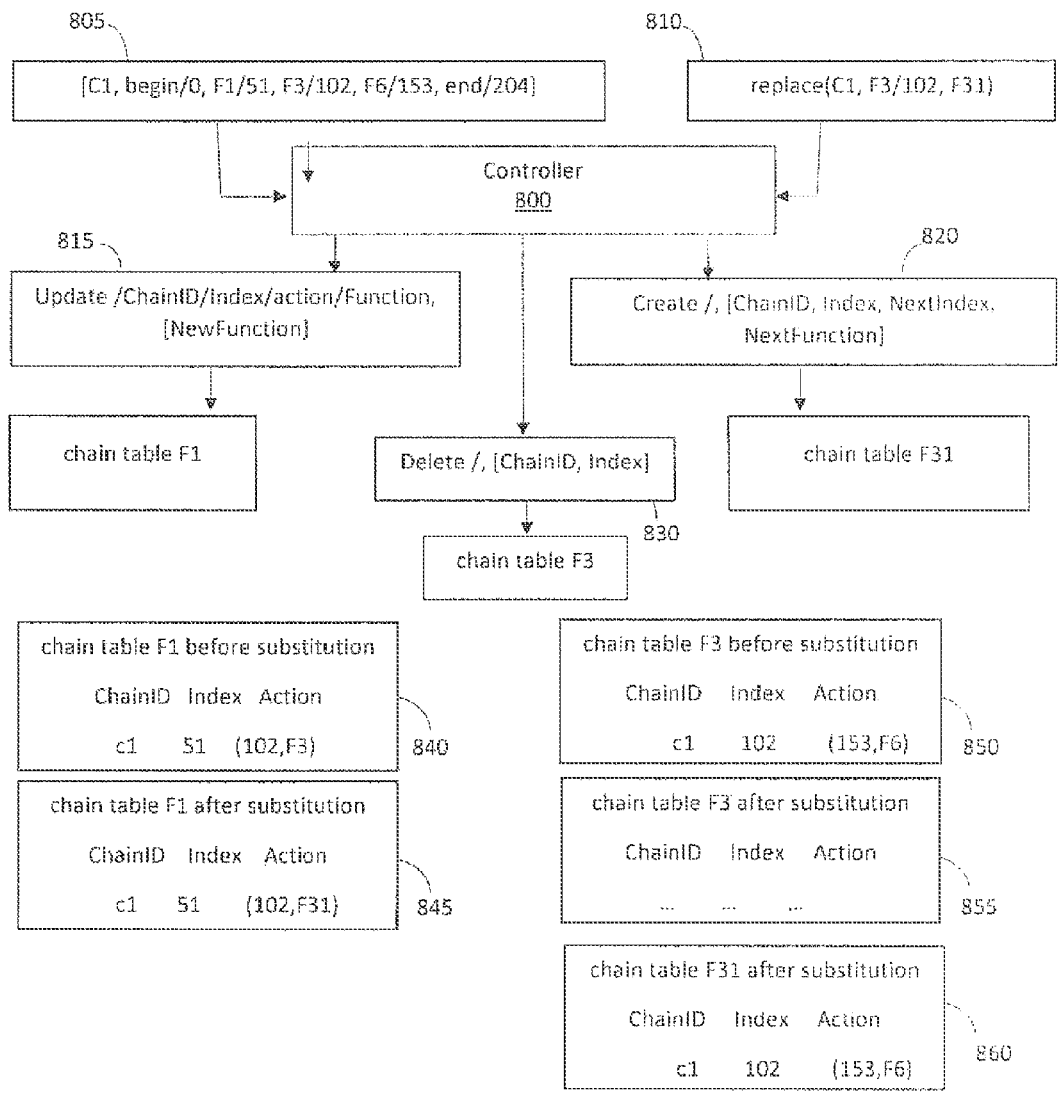
FIG. 8 is a diagram illustrating an exemplary controller configured to substitute a new service function in place of an existing service function in a service function chain using chain tables according to embodiments of the present invention.

With regard to FIG. 8, an exemplary controller 800 configured to substitute a new service function in place of an existing service function in a service function chain using chain tables is depicted according to embodiments of the present invention. Controller 800 receives a chain description 805 describing a chain C1 having service functions F1, F3, and F6 with a gap value of 51. A replace instruction 810 is also received by controller 800 and indicates that a service function F3 at index 102 of chain C1 is to be replaced with service function F31. Chain table API instruction 820 is used to create chain table F31 (835): Create/, [ChainID, Index, NextIndex, NextFunction]. Because service function F31 is replacing service function F3 at index 102, the instruction for chain table F31 is Create/, [c1, 102, 153, F6], where service function F6 at index 153 is the next service function in the chain after service function F31. F31 chain table (860) depicts the F31 chain table after the controller has deployed a modified chain table based on the substitution operation.

Chain table API instruction 830 is used to update chain table F1 (840) to reflect the substitution of F31 for F1 in chain c1: Update/ChainID/Index/action/Function, [NewFunction]. Because service function F31 has replaced service function F3 at index 102, the instruction for chain table F1 is Update/c1/51/replace/F3, [F31]. F1 chain table (845) depicts the F1 chain table after the controller has deployed a modified chain table to F1 based on the substitution operation.

Chain table API instruction 830 is used to delete the entry for chain c1 from chain table F3 (850): Delete/, [ChainID, Index]. Chain table F3 (855) is depicted after the controller has deploy a modified chain table to service function F3 based on the deletion operation.

Figure 10:
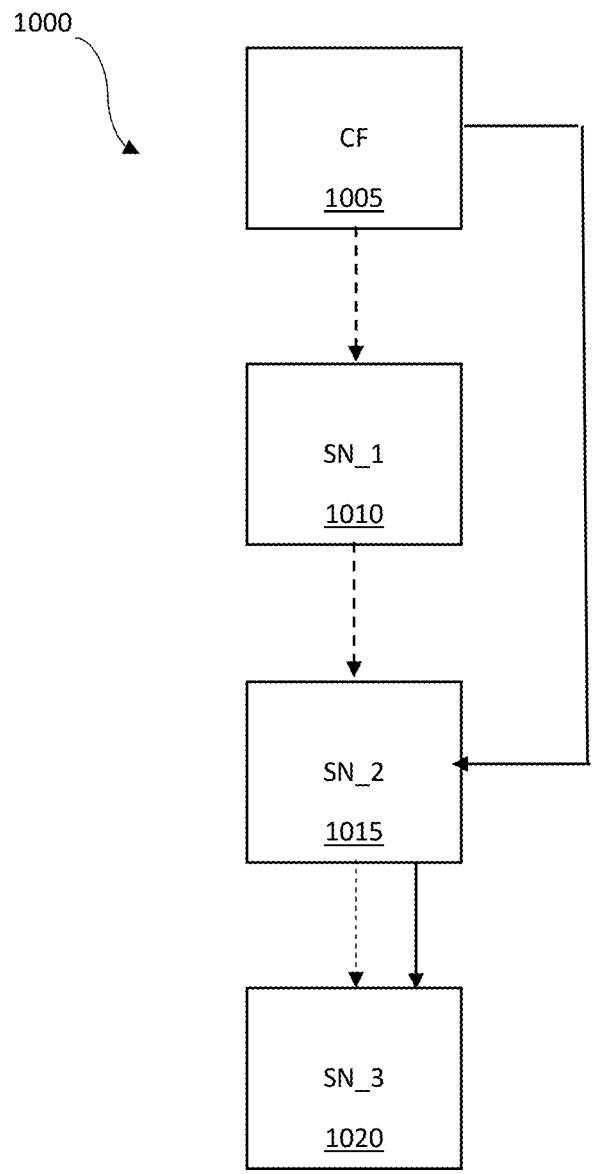
FIG. 10 is a diagram illustrating exemplary service chains configured to offload traffic of a data flow according to embodiments of the present invention.

With regard to FIG. 10, exemplary service chains configured to reroute traffic of a data flow are depicted according to embodiments of the present invention. Service chain C1 is depicted by the dashed lines in FIG. 10 and is defined as [C1, CF, SN_1, SN_2, SN_3], where CF, SN_1, SN_2, and SN_3 are service functions. In one example, the data flow depicted comprises a video flow and service function SN_1 is configured to perform deep packet inspection ("DPI"). After performing DPI, service function SN_1 determines that the data flow contains no threats and DPI is no longer necessary. A controller (e.g., controller 114 of FIGS. 1 and 2) constructs a new service chain C2 that does not include SN_1 (DPI). Chain C2 is depicted by the solid lines in FIG. 10 and is defined as [C2, CF, SN_2, SN_3]. The data flow is then rerouted to chain C2. There is no need to deploy C2 because all of the service functions of C2 have already been deployed by C1.

Figure 11A:
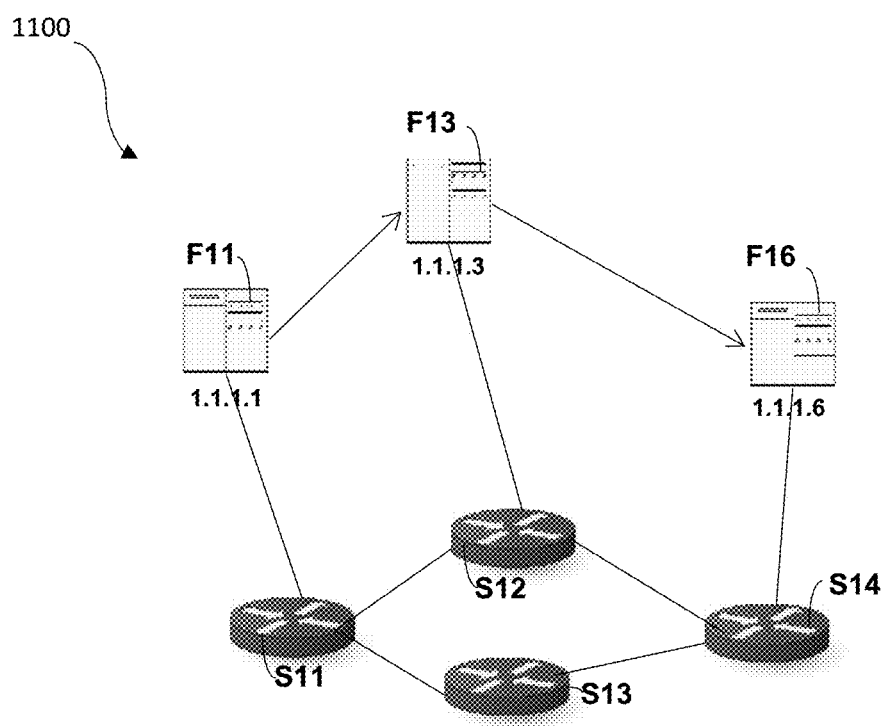
FIG. 11A is a diagram illustrating an exemplary service function network deployed using a substrate network of switches according to embodiments of the present invention.

With regard to FIG. 11A, an exemplary service function network 1100 deployed using a substrate network and comprising network switches is depicted according to embodiments of the present invention. Service function network 1100 comprises service functions F11, F12, and F13, where each is associated with an IP address. A substrate network comprises switches S11, S12, S13, and S14. As depicted, switch S14 is connected to F16, and switch S12 is connected to F13. It may be beneficial to move a service chain within a network or across networks to balance traffic load. It is appreciated that service functions may not change their identifiers but they may change their network addresses. However, the switches of the substrate network may be reconfigured without modifying the chain topology or chain tables deployed. The routing tables of the switches may be modified to the configuration depicted in FIG. 11B.

Figure 11B:
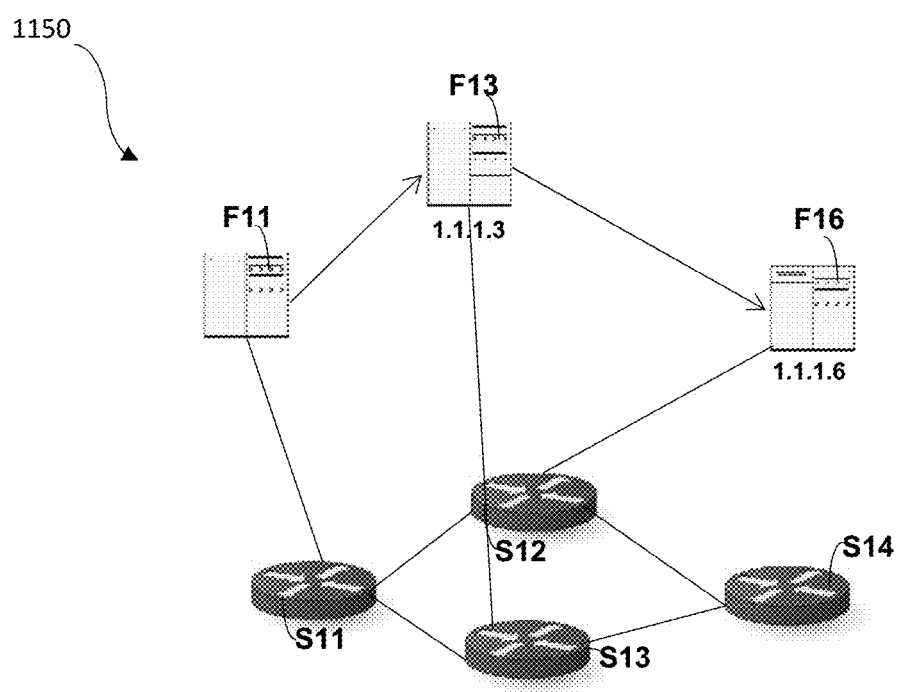
FIG. 11B is a diagram illustrating the exemplary service function network depicted in FIG. 11A redeployed to different switches in the same substrate network of switches to balance network load according to embodiments of the present invention.

With regard to FIG. 11B, an exemplary service function network 1150 redeployed to different switches of the substrate network is depicted according to embodiments of the present invention. Service function network 1150 comprises service functions F11, F12, and F13 as depicted in FIG. 11A, and each service function is associated with an IP address. A substrate network comprises switches S11, S12, S13, and S14. As depicted, switch S14 is no longer connected to F16, and switch S12 is no longer connected to F13. To better balance the load of the network, switch S13 is now connected to F13, and switch S12 is now connected to F16. The routing tables of switches S12, S13, and S14 are updated accordingly. The chain tables are not modified in this case.

Embodiments of the present invention are thus described. While the present invention has been described in particular embodiments, it should be appreciated that the present invention should not be construed as limited by such embodiments, but rather construed according to the following claims.

What is claimed is:

1. An apparatus for managing service function chains, the apparatus comprising:
   a controller controlling a plurality of service functions and
      a substrate network, wherein each service function of
      said plurality of service functions is associated with an
      identifier and a network address, and wherein the substrate network comprises a plurality of network switches coupled to the controller; and a chain table stored at a first service function of a service function chain, wherein the chain table stores an entry comprising a first identifier and a corresponding index of a next service function in the service function chain, wherein the corresponding index of the next service function is defined as the location of the next service function in the service function chain, and wherein the controller generates a mapping comprising network addresses and associated identifiers;

creates or modifies the entry of the chain table; and deploys the chain table to the first service function, and the first service function receives a packet; processes the packet; and transfers the packet to the next service function, wherein an indexed service function chain is derived from an original service function chain in which a gap value, based on the length of the original service function chain and a key size, is calculated to define the location of each of the service functions.

2. The apparatus of claim 1, wherein the first service function transfers the packet to the next service function by looking up the network address of the next service function using the mapping.

3. The apparatus of claim 1, wherein
the controller generates a routing table for the plurality of network switches, and
the routing table comprises an outgoing address and an outgoing port number associated with the outgoing address.

4. The apparatus of claim 3, wherein the first service function transfers the packet to the next service function by determining an address of the next service function using the mapping and determining a port number associated with the address using the routing table.

5. The apparatus of claim 1, wherein the indexed service function chain includes an identifier for each of the service functions in the indexed service function chain and the corresponding index defining the location for each of the service functions.

6. A method for managing service function chains, comprising:

controlling, via a controller, a plurality of service functions and a substrate network, wherein each service function of said plurality of service functions is associated with an identifier and a network address, and wherein the substrate network comprises a plurality of network switches coupled to the controller;

storing a chain table at a first service function of a service function chain, wherein the chain table stores an entry comprising the first identifier and an index of a next service function in the service function chain; and generating, via the controller, a mapping comprising network addresses and associated identifiers to create or modify the entry of the chain table and deploy the chain table to the first service function, wherein the first service function receives a packet, processes the packet to change a destination address of the packet to the address of the next service function in the chain according to the mapping, and transfers the packet to the next service function, wherein an indexed service function chain is derived from an original service function chain in which a gap value, based on the length of the original service function chain and a key size, is calculated to define the location of each of the service functions.

7. The method of claim 6, further comprising transferring the packet to the next service function by looking up the network address of the next service function using the mapping.

8. The method of claim 6, wherein the method further comprises generating a routing table for the plurality of network switches, wherein
the routing table comprises an outgoing address and an outgoing port number associated with the outgoing address.

9. The method of claim 8, further comprising transferring the packet to the next service function by determining an address of the next service function using the mapping and determining a port number associated with the address using the routing table.

10. The method of claim 6, wherein the first service function extracts the first identifier and the index of the next service function from the packet, and accesses the entry in the chain table of the service function corresponding to the first identifier and the index.

* * * * *